(12) United States Patent
Hoppe

(10) Patent No.: US 7,157,140 B1
(45) Date of Patent: Jan. 2, 2007

(54) MALLEABLE COMPOSITES AND METHODS OF MAKING AND USING THE SAME

(75) Inventor: Karl M. Hoppe, Lewiston, MN (US)

(73) Assignee: RTP Company, Winona, MN (US)

( * ) Notice: Subject to any disclaimer, the term of this patent is extended or adjusted under 35 U.S.C. 154(b) by 102 days.

(21) Appl. No.: 10/792,474

(22) Filed: Mar. 3, 2004

(51) Int. Cl.
C08K 7/16 (2006.01)
C08K 13/06 (2006.01)

(52) U.S. Cl. ............... 428/402; 524/401; 524/406; 524/408; 524/413; 524/434; 524/436; 524/440; 428/12

(58) Field of Classification Search ............ 524/401, 524/406, 408, 413, 434, 436, 440; 428/12, 428/402
See application file for complete search history.

(56) References Cited

U.S. PATENT DOCUMENTS

| | | |
|---|---|---|
| 2,409,307 A | 10/1946 | Patch et al. |
| 4,674,409 A | 6/1987 | Lopata et al. |
| 4,711,681 A | 12/1987 | Grossmann et al. |
| 5,088,415 A | 2/1992 | Huffman et al. |
| 5,189,252 A | 2/1993 | Huffman et al. |
| 5,352,311 A | 10/1994 | Quigley |
| 5,375,529 A | 12/1994 | Knight, Jr. et al. |
| 5,413,060 A | 5/1995 | Quigley |
| 5,437,899 A | 8/1995 | Quigley |
| 5,540,870 A | 7/1996 | Quigley |
| 5,719,352 A | 2/1998 | Griffin |
| 5,766,653 A | 6/1998 | Wiggs et al. |
| 5,891,071 A | 4/1999 | Stearns et al. |
| 5,950,064 A | 9/1999 | Robinson et al. |
| 6,048,379 A | 4/2000 | Bray et al. |
| 6,090,178 A | 7/2000 | Benini |
| 6,096,245 A | 8/2000 | Tanigaki et al. |
| 6,207,761 B1 | 3/2001 | Smith et al. |
| 6,263,798 B1 | 7/2001 | Benini |
| 6,342,280 B1 | 1/2002 | Patrick et al. |
| 6,363,856 B1 | 4/2002 | Stoker, Jr. et al. |
| 6,416,613 B1 | 7/2002 | Patrick et al. |
| 6,576,697 B1 | 6/2003 | Brown, Jr. |
| 2002/0006998 A1* | 1/2002 | Furukawa et al. .......... 524/445 |
| 2002/0150752 A1 | 10/2002 | Debalme et al. |

FOREIGN PATENT DOCUMENTS

| | | |
|---|---|---|
| EP | 0 579 163 | 9/1998 |
| EP | 0 967 060 | 12/1999 |
| EP | 1 093 900 | 4/2001 |
| JP | 1320200 | 12/1989 |
| JP | 2246755 | 10/1990 |
| WO | 96/32439 | 10/1996 |
| WO | 2004/014994 | 2/2004 |

OTHER PUBLICATIONS

"Household Application For Reinforced Thermoplastic", *Adv. Comp. Bulletin* p. 6 (Sep. 1990).
"Porsche Switches to Composite Oil Sump" *Plast. News* (*USA*) p. 12, No. 21 (Jul. 1989) (abstract only).
"Sheet Moulding Compound: SMC" Saint-Gobain Vetrotex, (Mar. 27, 2003) http://www.vetrotexasiapacific.com/fabrication_process/rap_smc.html.

* cited by examiner

*Primary Examiner*—Kelechi C. Egwim
(74) *Attorney, Agent, or Firm*—McDermott Will & Emery LLP

(57) ABSTRACT

Malleable thermoplastic composite materials are provided. More specifically, malleable thermoplastic composite materials made from thermoplastic polymers having low molecular weight and particulate material are provided for malleable composites having high compression set. Alternatively, malleable composite blends of two or more thermoplastic polymers are provided wherein at least one thermoplastic polymer has a low molecular weight. Further, the malleable thermoplastic composites may be blended with high specific gravity particulate material to form high specific gravity composites that exhibit malleable characteristics.

20 Claims, No Drawings

MALLEABLE COMPOSITES AND METHODS OF MAKING AND USING THE SAME

TECHNICAL FIELD

The embodiments of the present invention relate to malleable composites and methods of making and using the same. Specifically, the embodiments of the present invention relate to malleable composites having high compression set made from one or more thermoplastic polymers and an amount of a particulate material or a blend of particulate materials. Further, the malleable composites may be made from high specific gravity particulate material to form high specific gravity composites that exhibit malleable characteristics.

BACKGROUND

It is generally known to blend thermoplastic polymers with particulate material to impart specific properties to composites made therefrom. For example, particulate material is blended with thermoplastic polymers to create composites having improved puncture resistance, strength, tear resistance, electrical conductivity, and other characteristics. Specifically, it is known to blend clays, fibers or other like particulate material into a thermoplastic polymer and to mix the blend while the thermoplastic is in a molten state to form a composite material having increased strength when solidified and molded into articles.

Moreover, it is known to blend high specific gravity materials into thermoplastic polymers to attempt to approximate or mimic the characteristics of high specific gravity metals, such as lead. Specifically, it is desirable to create a composite material having the properties of lead, such as, for example, malleability and high specific gravity.

Malleable materials may be utilized in a number of applications. Specifically, high specific gravity malleable materials may be utilized in ammunition cores or fishing weights. For example, ammunition cores and fishing weights are typically made from lead. In the case of ammunition cores, lead is desirable because it has the dual property of high specific gravity and malleability, such that it is useful as a projectile and can easily be formed into ammunition cores by swaging the lead without distortion of the jacket or casing.

However, it is known that lead causes developmental problems in humans, particularly children, and animals, such as birds (particularly the common loon), fish, and other animals, and can have acute effects on individuals when exposed thereto at high concentrations. In many places around the world, lead has caused environmental contamination due to its wide use in ammunition, fishing weights, and other products. For example, firing ranges, where lead-based projectiles are fired from firearms, can be seriously contaminated with spent lead cores that litter target sites. Clean-up of lead contaminated sites is a major priority of the U.S. Government. The armed forces have allocated millions of dollars to clean sites polluted with lead from firearms. Therefore, a suitable replacement for lead is desired and sought.

However, typical high specific gravity thermoplastic composite materials do not have the proper properties to make them useful as lead substitutes because they lack such a property as malleability. In addition, many non-lead, high specific gravity thermoplastic and metal-containing composite materials may not be malleable like lead, in that the materials do not deform and retain their shapes properly to be useful, such as, for example, in projectiles or fishing weights.

For example, when swaging a bullet in an ammunition jacket or casing with a high specific gravity material, distortion can occur in the ammunition jacket or casing due to unyielding properties of the high specific gravity material. Therefore, the high specific gravity material must have the dual properties of having a high specific gravity while also being malleable such that the material deforms and substantially retains its shape after deformation when encased by an ammunition jacket or casing. This allows the ammunition to be properly fired from a firearm without damaging the firearm or having an unintended trajectory. Moreover, high specific gravity malleable materials should be deformable in molds to form precise and repeatable items, such as fishing weights and the like.

Prior attempts to create composite materials having high specific gravity and malleability have included melt-mixing a thermoplastic material with a high specific gravity particulate filler. However, these high specific gravity composite materials do not provide adequate lead-like characteristics, in that the materials do not have both high specific gravities while also having the ability to deform and hold their shapes properly.

Therefore, a need exists for a malleable composite material made from thermoplastic polymers or blends thereof and particulate material. Specifically, a need exists for a thermoplastic composite material having particulate filler and malleability, such that the thermoplastic composite material can readily deform under pressure without any or significant recovery of its shape. Moreover, a need exists for a thermoplastic composite material having the dual characteristics of high specific gravity and malleability such that the material may be useful as a substitute for lead or lead-based materials, but without the toxic characteristics of lead or lead-based materials. Moreover, a need exists for a malleable thermoplastic composite material that may be easily extruded to form pellets or molded articles. In addition, a need exists for a high specific gravity thermoplastic composite material that may be utilized in the manufacture of products as a lead replacement, such as, for example, in projectiles and fishing weights.

SUMMARY

The present invention relates to thermoplastic composite materials that are malleable. More specifically, the present invention relates to thermoplastic composite materials comprising a particulate filler and a thermoplastic polymer or blend of thermoplastic polymers having high compression set. More specifically, the present invention relates to thermoplastic composite materials having the dual characteristics of having high specific gravity and malleability. For example, the present invention relates to thermoplastic composite materials that form high specific gravity articles that are deformable, thereby being utilized as a substitute for lead.

The present invention relates to a thermoplastic composite material comprising a thermoplastic polymeric base resin or a blend of thermoplastic resins and a particulate material blended therein to form a malleable thermoplastic composite material. The thermoplastic composite material comprises a thermoplastic polymeric base resin or a blend of thermoplastic resins having high compression set blended with a high specific gravity particulate material to form thermoplastic composites having the dual characteristics of high specific gravity and malleability. Moreover, the present invention relates to methods of making and using the same.

To this end, in an embodiment of the present invention, a malleable thermoplastic composite is provided comprising a base resin comprising a low molecular weight thermoplastic having a melt flow index of greater than about 1000 dg/min pursuant to ASTM D1238-98, and a particulate material having a density greater than about 2.5 g/cm$^3$ blended with the first thermoplastic polymer at a concentration of between about 60 percent by weight and about 99 percent by weight of the composite material and wherein the particulate material has an aspect ratio of less than about 50.

The particulate material is preferably selected from the group consisting of tungsten, barium sulfate, copper and its alloys, brass, bronze, zinc and its alloys, bismuth, iron and its alloys, mixtures thereof and other like particulate material.

The malleable thermoplastic composite has a compression set above about 40 percent pursuant to ASTM D395-03 Method B.

Preferably, the particulate material has a density of between about 2.5 g/cm$^3$ and about 20 g/cm$^3$.

More preferably, the particulate material has a density of between about 4 g/cm$^3$ and about 20 g/cm$^3$.

Most preferably, the particulate material has a density of between about 7 g/cm$^3$ and about 20 g/cm$^3$.

The malleable thermoplastic composite further comprises a lubricating processing aid blended with said base resin and said particulate material.

The lubricating processing aid is selected from the group consisting of polyvinylidene fluoride-hexafluoropropylene, perfluoropolyethylene, perfluoropolyether, sodium stearate, calcium stearate, zinc stearate, aluminum stearate, magnesium stearate, cerium stearate, fatty acid esters, neoalkoxy titanates, silicone liquid, fatty acid amides, mixtures thereof, and other like lubricating processing aids.

An article of manufacture is preferably made from the malleable thermoplastic composite.

In an alternate embodiment of the present invention, a malleable thermoplastic composite is provided comprising a thermoplastic base resin comprising a blend of a first thermoplastic polymer having a low molecular weight and further having a melt flow index of greater than about 1000 dg/min pursuant to ASTM D1238-98 and a second thermoplastic polymer, and a particulate material having a density greater than about 2.5 g/cm$^3$ blended with the first thermoplastic polymer at a concentration of between about 60 percent by weight and about 99 percent by weight of the composite material.

The particulate material is selected from the group consisting of tungsten, mica, fused silica, talc, calcium carbonate, barium sulfate, wollastonite, kaolin clays, glass beads, bismuth, copper and its alloys, stainless steel, iron and its alloys, carbonyl iron powder, brass, bronze, zinc and its alloys, mixtures thereof, and other like particulate materials.

Alternatively, the particulate material has an aspect ratio of less than about 50. Moreover, the particulate material may be selected from the group consisting of tungsten, barium sulfate, copper and its alloys, brass, bronze, zinc and its alloys, bismuth, iron and its alloys, mixtures thereof, and other like particulate material.

The first low molecular weight thermoplastic polymer may be present in an amount above about 5% by weight of the thermoplastic base resin blend.

The malleable thermoplastic composite has compression set above about 40 percent pursuant to ASTM D395-03 Method B.

Preferably, the particulate material has a density of between about 4 g/cm$^3$ and about 20 g/cm$^3$.

More preferably, the particulate material has a density of between about 7 g/cm$^3$ and about 20 g/cm$^3$.

The malleable thermoplastic composite further comprises a lubricating processing aid blended with said thermoplastic base resin and said particulate material. The lubricating processing aid is selected from the group consisting of polyvinylidene fluoride-hexafluoropropylene, perfluoropolyethylene, perfluoropolyether, sodium stearate, calcium stearate, zinc stearate, aluminum stearate, magnesium stearate, cerium stearate, fatty acid esters, neoalkoxy titanates, silicone liquid, fatty acid amides, mixtures thereof and other like lubricating processing aids.

An article of manufacture is made from the malleable thermoplastic composite.

A composite material, therefore, is provided that is made from a thermoplastic polymer or blend of thermoplastic polymers and a particulate material. More preferably, a composite material is provided that is made from a thermoplastic polymer or blend of thermoplastic polymers and a high specific gravity particulate material wherein the composite material has properties similar to lead, such as malleability and high specific gravity. Moreover, the malleable high specific gravity material can be utilized as a replacement for lead in specific applications, such as in projectiles and fishing weights.

In addition, the malleable composite materials of the present invention have properties similar to lead, but may not have the toxic characteristics of lead. Therefore, the malleable composite material of the present invention may not cause the developmental problems in humans and animals. Moreover, the malleable composite materials of the present invention may not cause the acute toxic affects that lead can cause.

Moreover, the malleable composite material may be formed into shaped articles. Specifically, the malleable composite material may be pelletized for shipment or storage. The pellets of the malleable composite material may be further melted and formed into other various shaped articles, without losing the malleable properties of the composite material. Alternatively, the malleable composite material may be formed directly into shaped articles, such as for applications such as fishing weights, ammunition, automotive applications, and medical applications.

Additional features and advantages of the present invention are described in, and will be apparent from, the detailed description of the presently preferred embodiments.

DETAILED DESCRIPTION OF THE PRESENTLY PREFERRED EMBODIMENTS

The embodiments of the present invention relate to malleable composites and methods of making and using the same. Specifically, the present invention relates to malleable composites having high compression set made from one or more thermoplastic polymers and an amount of a particulate material or a blend of particulate materials. Further, the malleable composites may be made from high specific gravity particulate material to form high specific gravity composites that exhibit malleable properties.

Malleability is generally defined as the ability of a material to form and retain its formed shape. The Merriam-Webster dictionary defines "malleable" as "1: capable of being extended or shaped by beating with a hammer or by the pressure of rollers". Merriam-Webster Dictionary, 703 (10th ed. 2001). For purposes of thermoplastic composite material, the property of compression set is useful in determining whether a material is malleable. Compression set is defined as the amount a material fails to recover its original shape after being deformed under pressure at a defined temperature for a specified period of time. Typically the method of measuring compression set is done by compressing a cylindrical button or disk of the material to a fixed height (typically about 70% or 75% of its original height) at a defined temperature for a specified period of time. The button or disk is then released and allowed a certain period of time to recover (typically about 30 minutes). The thickness of the button or disk is then measured again. The compression set is the height of the button or disk that is not recovered expressed as a percentage of the amount by which it was compressed. Compression set is measured using the following equation:

$$\% \text{ Compression Set} = \frac{(\text{Original thickness} - \text{final thickness})}{(\text{Original thickness} - \text{compressed thickness})} \times 100 \quad \text{(Formula I)}$$

ASTM D395-03 Method B ("ASTM D395-03 B") describes a standard method to measure the compression set of a thermoplastic material. Specifically, ASTM D395-03 B measures the amount a material compresses in a compression device, which consists of two or more flat steel plates between the parallel faces of which the material may be compressed. Steel spacers for the required amount of compression are placed on each side of the material to be measured to control the materials thickness while compressed. First, the original thickness of the material to be tested is measured. The material is then placed within the compression device. The bolts of the compression device are tightened so that the plates are drawn together uniformly until they are in contact with the spacers. Typically, the amount of compression is about 25%, such that the compressed material is 75% of its original height. Pursuant to ASTM D395-03 B, the suitable temperature and time for the compression of the material, depending on the conditions of the expected application of the material, may be chosen by the tester. For comparison purposes, identical temperature and test periods must be used. After the material is compressed for the desired time period at the desired temperature, the material is removed from the compression device and allowed to recover for 30 minutes, whereupon the thickness of the material is measured again. Formula I is utilized to determine the percent compression set of the material.

For purposes of the present invention, a desired application of the malleable composite material is its use in ammunition. Typically, ammunition is made by taking an empty jacket and "swaging" lead thereinto. Swaging may be done by inserting an amount of the lead, or other material, into the jacket and setting the lead in the jacket via pressure. Because of its malleability, the lead fills the jacket thereby taking the shape of the jacket without deforming or rupturing the jacket. Moreover, the lead takes the shape of the jacket without significantly recovering its shape, thereby allowing the jacket to be capped thereby trapping the lead contained therein in its formed shape. Therefore, for purposes of testing the compression set of the composite material of the present invention, it is desirable to test the material at a relatively short compression period at room temperature, similar to the application of pressing the composite material into ammunition jackets. Therefore, the compression set of the composite material described herein is measured after compression for one hour at room temperature. Pursuant to ASTM 395-03 B, the thickness of the material is measured 30 minutes after being released from the compression device.

A material having a high compression set fails to substantially recover its original shape after being formed. More specifically, "high compression set" for purposes of the material described herein pursuant to the test method described above is generally a compression set of between about 40 percent and about 100 percent. A thermoplastic polymer having a 100 percent compression set shows no signs of recovering its original shape after being formed and completely retains its compressed shape. A thermoplastic polymer having a zero percent compression set completely recovers its original shape after being formed. Elastomeric polymers tend to have low compression set, in that elastomers may be particularly elastic and typically recover their original shapes after being deformed.

The present invention relates to a malleable thermoplastic composite material made from a base resin of at least one thermoplastic material blended with a particulate material. The composite has a high compression set. Typically, thermoplastic polymers useful for the present invention have a compression set of at least 40 percent pursuant to test method ASTM D395-03 B, as described above.

The thermoplastic base resin of the malleable composite materials of the present invention may comprise at least a first thermoplastic polymer wax having a low molecular weight. Suitable low molecular weight waxes useful for the present invention include, for example, low molecular weight polyethylene and polypropylene. More specifically, low molecular weight polyethylene includes low molecular weight low density polyethylene homopolymers or copolymers, low and high density oxidized polyethylene homopolymers or copolymers, ethylene-acrylic acid copolymers, ethylene-vinyl acetate copolymers, ethylene-carbon monoxide copolymer, ethylene-maleic anhydride copolymers, and other like ethylene homopolymers or copolymers. Moreover, suitable low molecular weight polypropylenes may include polypropylene wax, maleated polypropylene wax, and other like low molecular weight polypropylenes. Other suitable low molecular weight materials may include low molecular weight ionomers, paraffin wax, hydrocarbon wax and other like low molecular weight materials.

"Low molecular weight" polymers suitable for the present invention include those thermoplastic polymers having a melt flow index of greater than about 1000 dg/min. For most ethylene-based homopolymers and copolymers, the melt flow index of the low molecular weight polymer is measured at 190° C. under a weight of about 2.16 kilograms, pursuant to ASTM D1238-98. For polypropylene-based materials, the melt flow index of the material is measured at 230° C. under a weight of about 2.16 kilograms, pursuant to ASTM D1238-98.

The malleable composite material of the present invention may comprise only the low molecular weight thermoplastic polymer, as described above, combined with the particulate material and small amounts of processing aids. Alternatively, the composite material of the present invention may comprise a blend of the low molecular weight thermoplastic polymer with a second thermoplastic polymer. Specifically, the second thermoplastic polymer may be selected to aid in the processability of the composite material through melt processing equipment. Generally, low molecular weight thermoplastic polymers having melt flow indices of greater than about 1000 dg/min may be difficult to process by themselves through melt processing equipment, particularly at high temperatures. By adding a second thermoplastic polymer to the low molecular weight thermoplastic polymer, the composite material may be more easily processed. The second thermoplastic polymer may be also have a low molecular weight (i.e., having a melt flow index of greater than about 1000 dg/min pursuant to ASTM D1238-98). Typically, the second thermoplastic polymer has a high molecular weight.

The high molecular weight thermoplastic polymer may be any thermoplastic polymer suitable to be added to the low molecular weight thermoplastic material to form the malleable composite of the present invention. The high molecular weight thermoplastic polymer may include elastomers or non-elastomers, such as, for example, polyolefins, polyamides, styrenic block copolymers, polyesters, polyacetals, polycarbonates, polyacrylics, polyacrylates, polyketones, polyurethanes, polyphenylene ethers, polyvinyl chloride, fluoropolymers, polyimides, blends thereof and other like high molecular weight thermoplastic polymers. For example, the second thermoplastic polymer may comprise a high molecular weight thermoplastic low density polyethylene having a broad molecular weight distribution, such as having a molecular weight distribution of greater than about 3. Alternatively, the second thermoplastic polymer may comprise a high molecular weight single site catalyzed low density polyethylene having a molecular weight distribution of less than about 3.

The low molecular weight thermoplastic polymer may be present in an amount above about 5% by weight of the thermoplastic base resin. Specifically, the low molecular weight thermoplastic polymer may be present in an amount of between about 5 percent by weight and about 100 percent by weight of the thermoplastic base resin. Therefore, the high molecular weight thermoplastic polymer of the present invention may be present in an amount between about 0 percent and about 95 percent by weight of the thermoplastic base resin.

The malleable composite material of the present invention is further heavily loaded with particulate filler. Typically, a particulate material having a density of above about 2.5 g/cm$^3$ is desired. More specifically, the particulate material may have a density of between about 2.5 g/cm$^3$ and about 20 g/cm$^3$. Most preferably, the particulate material has a density of between about 7 g/cm$^3$ and about 20 g/cm$^3$.

The particulate material may be present in the malleable composite of the present invention in a concentration of between about 60 percent by weight and about 99 percent by weight of the malleable composite.

Preferable particulate materials include, but are not limited to, tungsten, mica, fused silica, talc, calcium carbonate, barium sulfate, wollastonite, kaolin clays, glass beads, bismuth, such as bismuth trioxide and bismuth subcarbonate, copper and its alloys, stainless steel, iron and its alloys, carbonyl iron powder, brass, bronze, zinc and its alloys, mixtures thereof and other like particulate materials. Suitable particulate materials may preferably have an aspect ratio of less than about 50. More preferably, useful materials having an aspect ratio less than about 50 include tungsten, barium sulfate, copper and its alloys, brass, bronze, zinc and its alloys, bismuth, iron and its alloys, mixtures thereof and other like particulate materials having an aspect ratio of less than about 50.

The thermoplastic base resin or base resin blend, detailed above, in combination with the particulate material is preferably blended with a lubricating processing aid to aid the processing of the material through extrusion equipment, molding equipment and/or forming operations.

Preferably, the processing aid that may be utilized in the embodiments of the present invention includes fluoropolymers, such as, preferably, polyvinylidene fluoride-hexafluoropropylene, perfluoropolyethylene, perfluoropolyether, and other like lubricating processing aids. Alternate materials include metallic stearates, such as sodium stearate, calcium stearate, zinc stearate, aluminum stearate, magnesium stearate and cerium stearate. Moreover, other lubricating processing aids may include fatty acid esters, neoalkoxy titanates, silicone liquid, fatty acid amides and other like lubricating processing aids. Other typical lubricating processing aids and mixtures thereof may be utilized in the composites of the present invention that are typically utilized by those skilled in the art of polymer compounding. The processing aid may be present in an amount between about 0.01 percent by weight to about 5 percent by weight of the composite material. More preferably, the processing aid may be present in an amount between about 0.05 percent by weight and about 3 percent by weight of the composite material. Most preferably, the processing aid may be present in an amount between about 0.1 percent by weight and about 2 percent by weight of the composite material.

Other materials that may be included in the composite material of the present invention include pigments, dyes, stabilizers, such as antioxidants or the like, and/or other processing aids, or other like materials typically utilized for thermoplastic extrusion.

The thermoplastic composite blends of the present invention may be made by mixing the base resin or base resin blend with the particulate material. Further, the other materials described in detail above may be added as well, such as the processing aid and/or stabilizers or the like. For example, the materials may be mixed in a Banbury mixer. Typically, the base resin or base resin blend may be mixed in pellet or otherwise solid form with the particulate material. The mixture may then be extruded through any typical extruder able to melt the mixture and process the same into the composite. Typically, those skilled in the art of making polymer composites would realize that the production of the composite could be done in a single screw extruder, twin screw extruder, batch mixer, profile extrusion process, in-line compounder, sheet extruder, two roll mill, or any other equipment commonly employed by those skilled in the art. The particulate material may be added at the feed throat of the extruder using separate feeders to avoid segregation of a blend due to density or particle size differences. In addition, the particulate material may be added downstream of the melt extruder feed throat so as to minimize the abrasion of the metal surfaces of the melt extruder by the particulate material, or to minimize shear degradation of the polymer or blend of polymers.

In one embodiment, the thermoplastic composite blend is extruded into strands which are then chopped into malleable pellets. The malleable pellets may then be stored until a time when the pellets are to be utilized for production into a final product. For example, the pellets may be molded into articles via any molding process apparent to one having ordinary skill in the art. Typical articles for the composite material of the present invention may include ammunition cores or fishing weights, especially if the particulate material has a high specific gravity. Alternatively, the mixture may be melted and extruded and/or molded directly into the articles.

The malleable thermoplastic composite material of the present invention has a high compression set (i.e., a compression set of greater than about 40 percent). Moreover, the malleable thermoplastic composite material of the present invention preferably has a density of greater than about 2.5 g/cm$^3$. More preferably, the malleable thermoplastic composite material has a density of between about 4 g/cm$^3$ and about 12 g/cm$^3$. Most preferably, the malleable thermoplastic composite material has a density between about 7 g/cm$^3$ and about 12 g/cm$^3$. For suitable lead replacement applications, the thermoplastic composite material has a density of about 11.2 g/cm$^3$.

EXAMPLES

The following examples indicate preferable composite materials of the present invention. Each example generally comprises a base resin with a particulate material mixed with a lubricating processing aid, as well as stabilizers to form high specific gravity malleable composite materials.

Example 1

| Material Description | Amount by weight |
| --- | --- |
| LDPE (Broad molecular weight distribution) | 2.5% |
| Oxidized LDPE wax | 1.0% |
| Tungsten Powder | 96.5% |
| Perfluoropolyether | 0.2% |
| Stabilizers | <0.1% |

Example 2

| Material Description | Amount by weight |
| --- | --- |
| Single Site Catalyzed LDPE | 2.5% |
| Oxidized LDPE wax | 1.0% |
| Tungsten Powder | 96.5% |
| Perfluoropolyether | 0.2% |
| Stabilizers | <0.1% |

Example 3

| Material Description | Amount by weight |
| --- | --- |
| LDPE (Broad molecular weight distribution) | 2.0% |
| Oxidized LDPE wax | 1.05% |
| Polypropylene Homopolymer | 0.5% |
| Tungsten Powder | 96.45% |
| Perfluoropolyether | 0.1% |
| Stabilizers | <0.1% |

Example 4

| Material Description | Amount by weight |
| --- | --- |
| LDPE (Broad molecular weight distribution) | 2.0% |
| Oxidized LDPE wax | 1.05% |
| Polypropylene Homopolymer | 0.5% |
| Tungsten Powder | 96.45% |
| Calcium Stearate | 0.05% |
| Stabilizers | <0.1% |

The malleable high specific gravity thermoplastic composite materials of Examples 1–4 were made by feeding a blend of the pelletized resins from a gravimetric feeder into the feedthroat of a twin screw extruder. A blend of tungsten, pulverized resin, stabilizers and processing aid were fed from a second gravimetric feeder into the feedthroat of the same twin screw extruder. The mixture was then extruded into strands. Each strand was then chopped into malleable high specific gravity pellets for storage or shipment. The pellets were then melt processed via injection molding, compression molding or profile extrusion into malleable high specific gravity articles, such as test specimens, projectiles, fishing weights, or other like products.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

The invention claimed is:

1. A malleable thermoplastic composite comprising:
a base resin comprising a thermoplastic having a melt flow index of greater than about 1000 dg/min pursuant to ASTM D1238-98; and
a particulate material having a density greater than about 2.5 g/cm$^3$ blended with the thermoplastic polymer at a concentration of between 60 percent by weight and about 99 percent by weight of the composite material and having an aspect ratio of less than about 50.

2. The malleable thermoplastic composite of claim 1 wherein the particulate material is selected from the group consisting of tungsten, barium sulfate, copper and its alloys, brass, bronze, zinc and its alloys, bismuth, iron and its alloys, and mixtures thereof.

3. The malleable thermoplastic composite of claim 1 having a compression set above about 40 percent pursuant to ASTM D395-03 Method B.

4. The malleable thermoplastic composite of claim 1 wherein the particulate material has a density of between about 2.5 g/cm$^3$ and about 20 g/cm$^3$.

5. The malleable thermoplastic composite of claim 1 wherein the particulate material has a density of between about 4 g/cm$^3$ and about 20 g/cm$^3$.

6. The malleable thermoplastic composite of claim 1 wherein the particulate material has a density of between about 7 g/cm$^3$ and about 20 g/cm$^3$.

7. The malleable thermoplastic composite of claim 1 further comprising:
a lubricating processing aid blended with said base resin and said particulate material.

8. The malleable thermoplastic composite of claim 7 wherein the lubricating processing aid is selected from the group consisting of polyvinylidene fluoride-hexafluoropropylene, perfluoropolyethylene, perfluoropolyether, sodium stearate, calcium stearate, zinc stearate, aluminum stearate, magnesium stearate, cerium stearate, fatty acid esters, neoalkoxy titanates, silicone liquid, fatty acid amides and mixtures thereof.

9. An article of manufacture made from the malleable thermoplastic composite of claim 1.

10. A malleable thermoplastic composite comprising:
a thermoplastic base resin comprising a blend of a first thermoplastic polymer having a melt flow index of greater than about 1000 dg/min pursuant to ASTM D1238-98 and a second thermoplastic polymer; and
a particulate material having a density of greater than about 2.5 g/cm$^3$ blended with the first thermoplastic polymer at a concentration of between about 60 percent by weight and about 99 percent by weight of the composite material.

11. The malleable thermoplastic composite of claim 10 wherein the particulate material is selected from the group consisting of tungsten, mica, fused silica, talc, calcium carbonate, barium sulfate, wollastanite, kaolin clays, glass beads bismuth, copper and it alloys, stainless steel, iron and its alloys, carbonyl iron powder, brass, bronze, zinc and its alloys, and mixtures thereof.

12. The malleable thermoplastic composite of claim 10 wherein the particulate material has an aspect ratio of less than about 50.

13. The malleable thermoplastic composite of claim 12 wherein the particulate material is selected from the group consisting of tungsten, barium sulfate, copper and its alloys, brass, bronze, zinc and its alloys, bismuth, iron and its alloys, and mixtures thereof.

14. The malleable thermoplastic composite of claim 10 wherein the first thermoplastic polymer is present in an amount greater than about 5 percent by weight of the thermoplastic base resin.

15. The malleable thermoplastic composite of claim 10 having a compression set above about 40 percent pursuant to ASTM D395-03 Method B.

16. The malleable thermoplastic composite of claim 10 wherein the particulate material has a density of between about 4 g/cm$^3$ and about 20 g/cm$^3$.

17. The malleable thermoplastic composite of claim 10 wherein the particulate material has a density of between about 7 g/cm$^3$ and about 20 g/cm$^3$.

18. The malleable thermoplastic composite of claim 10 further comprising:
a lubricating processing aid blended with said base resin and said particulate material.

19. The malleable thermoplastic composite of claim 18 wherein the lubricating processing aid is selected from the group consisting of polyvinylidene fluoride-hexafluoropropylene, perfluoropolyethylene, perfluoropolyether, sodium stearate, calcium stearate, zinc stearate, aluminum stearate, magnesium stearate, cerium stearate, fatty acid esters, neoalkoxy titanates, silicone liquid, fatty acid amides and mixtures thereof.

20. An article of manufacture made from the malleable thermoplastic composite of claim 10.

* * * * *